(12) United States Patent
Storm et al.

(10) Patent No.: US 9,241,480 B2
(45) Date of Patent: Jan. 26, 2016

(54) FISHING LURE DEVICE

(71) Applicants: Kevin Storm, Olathe, KS (US); Robert Storm, Olathe, KS (US)

(72) Inventors: Kevin Storm, Olathe, KS (US); Robert Storm, Olathe, KS (US)

(*) Notice: Subject to any disclaimer, the term of this patent is extended or adjusted under 35 U.S.C. 154(b) by 12 days.

(21) Appl. No.: 14/199,354

(22) Filed: Mar. 6, 2014

(65) Prior Publication Data

US 2015/0250153 A1 Sep. 10, 2015

(51) Int. Cl.
*A01K 85/16* (2006.01)
*A01K 85/01* (2006.01)
*A01K 85/12* (2006.01)
*A01K 95/00* (2006.01)

(52) U.S. Cl.
CPC ............... *A01K 85/01* (2013.01); *A01K 85/12* (2013.01); *A01K 85/16* (2013.01); *A01K 95/00* (2013.01)

(58) Field of Classification Search
CPC ............................. A01K 85/00; A01K 85/06
USPC ................. 43/42, 42.03, 42.13, 42.19, 42.27, 43/42.46, 42.47, 42.36; D22/132
See application file for complete search history.

(56) References Cited

U.S. PATENT DOCUMENTS

| | | | | |
|---|---|---|---|---|
| 2,011,075 A | * | 8/1935 | Pflueger | ....................... 43/42.44 |
| 2,623,318 A | | 12/1952 | Weigandt | |
| D172,024 S | * | 4/1954 | Hogreff | ....................... D22/128 |
| 2,719,377 A | * | 10/1955 | Bennett | ....................... 43/42.27 |
| 2,737,751 A | * | 3/1956 | Munsch | ....................... 43/42.47 |
| 2,760,294 A | * | 8/1956 | Morrill, Jr. | ...................... 43/42.45 |
| 2,765,571 A | * | 10/1956 | Sinclair | ....................... 43/42.34 |
| 3,221,436 A | * | 12/1965 | Mikus | ........................... 43/42.17 |
| 3,757,455 A | | 9/1973 | Strader | |
| 3,871,122 A | | 3/1975 | Jacobs | |
| D260,805 S | * | 9/1981 | Gregg | ........................... D22/132 |
| 5,209,008 A | | 5/1993 | Kasznica | |
| D350,803 S | * | 9/1994 | Koss, Jr. | ....................... D22/132 |
| 6,108,961 A | * | 8/2000 | Milawski et al. | ............ 43/42.19 |
| D554,228 S | | 10/2007 | Robertson | |
| 2008/0202016 A1 | | 8/2008 | Robertson | |
| 2011/0072706 A1 | | 3/2011 | Tsai | |

FOREIGN PATENT DOCUMENTS

| | | |
|---|---|---|
| CA | 2431684 | 11/2003 |
| CN | 201821790 | 5/2011 |

\* cited by examiner

*Primary Examiner* — David Parsley
*Assistant Examiner* — Danielle Clerkley

(57) ABSTRACT

A fishing lure device attracts fish using sound, movement, reflection and appearance. The device includes an elongated main body having a front end, a rear end and a perimeter surface coupled to and extending between the front end and the rear end. A longitudinal axis extends through the main body between the front end and the rear end. At least one hook is attached to the main body. Each hook is configured to catch a fish thereon. A pair of panels is coupled to the main body. Each of the panels is angled upwardly and outwardly away from a top side of the main body. The panels are orientated in opposite directions with respect to each other and orientated perpendicular with respect to the longitudinal axis of the main body.

10 Claims, 5 Drawing Sheets

FISHING LURE DEVICE

BACKGROUND OF THE DISCLOSURE

Field of the Disclosure

The disclosure relates to fishing lures and more particularly pertains to a new fishing lure for attracting fish using sound, movement, reflection and appearance.

SUMMARY OF THE DISCLOSURE

An embodiment of the disclosure meets the needs presented above by generally comprising an elongated main body having a front end, a rear end and a perimeter surface coupled to and extending between the front end and the rear end. A longitudinal axis extends through the main body between the front end and the rear end. At least one hook is attached to the main body. Each hook is configured to catch a fish thereon. A pair of panels is coupled to the main body. Each of the panels is angled upwardly and outwardly away from a top side of the main body. The panels are orientated in opposite directions with respect to each other and orientated perpendicular with respect to the longitudinal axis of the main body.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAPANELS

The disclosure will be better understood and objects other than those set forth above will become apparent when consideration is given to the follopanel detailed description thereof. Such description makes reference to the annexed drapanels wherein.

DESCRIPTION OF THE PREFERRED EMBODIMENT

Figure 1:
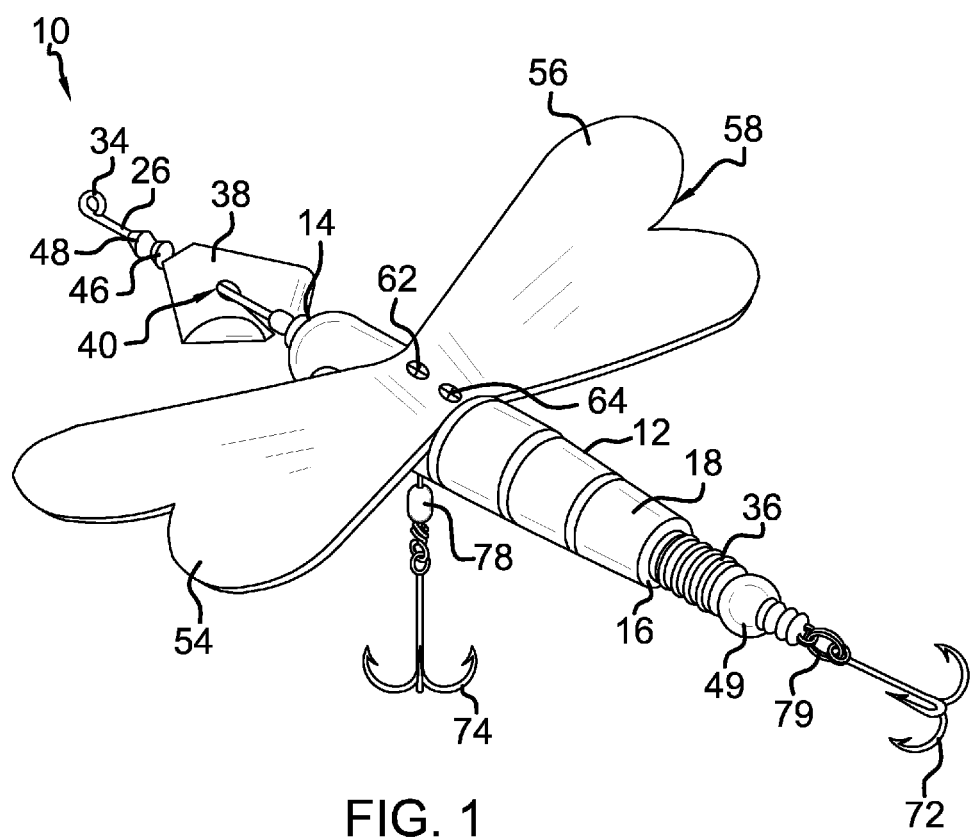
FIG. 1 is a top rear side perspective view of a fishing lure device according to an embodiment of the disclosure.
Figure 2:
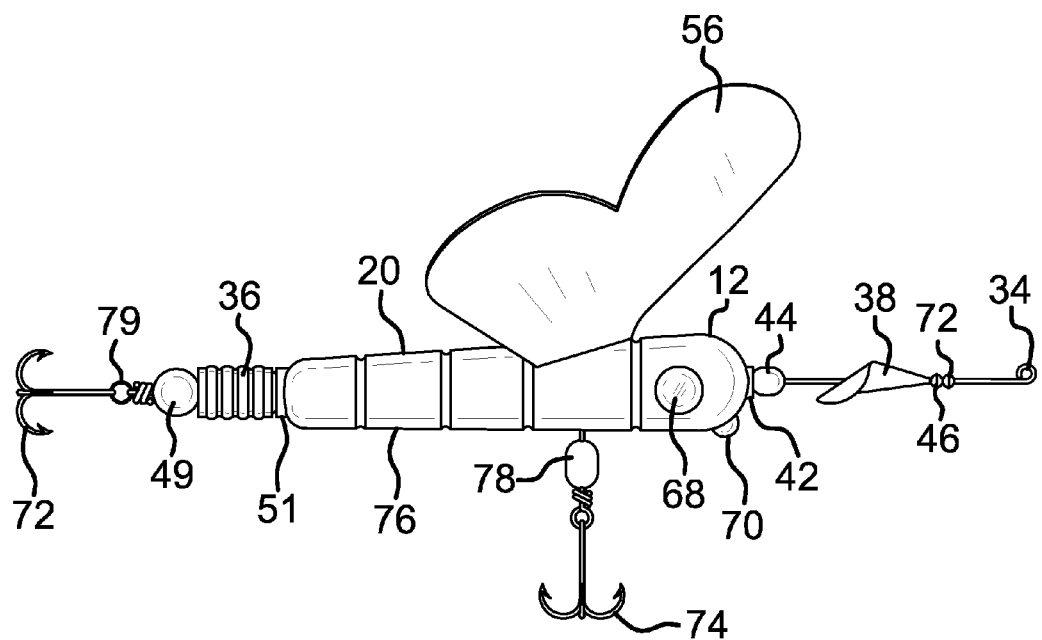
FIG. 2 is a side view of an embodiment of the disclosure.
Figure 3:
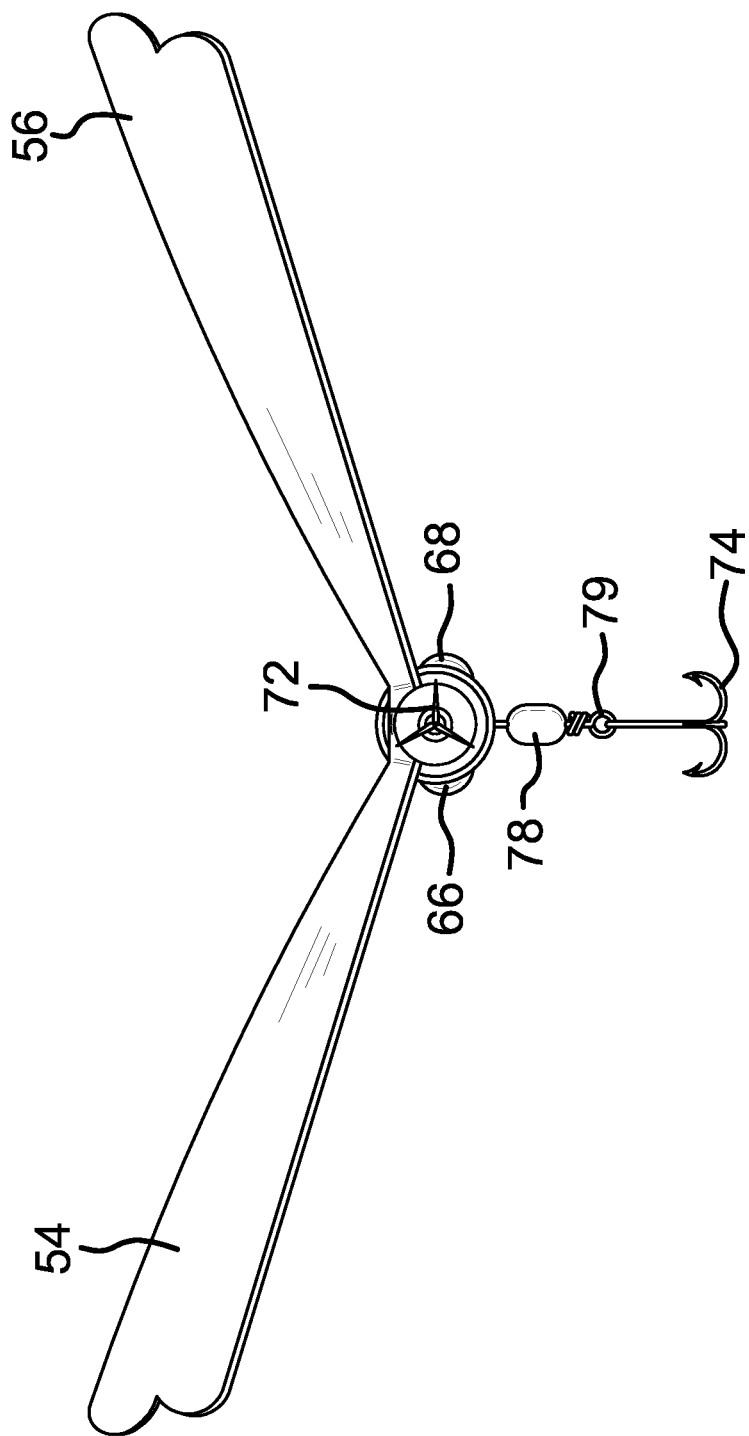
FIG. 3 is a rear view of an embodiment of the disclosure.
Figure 4:
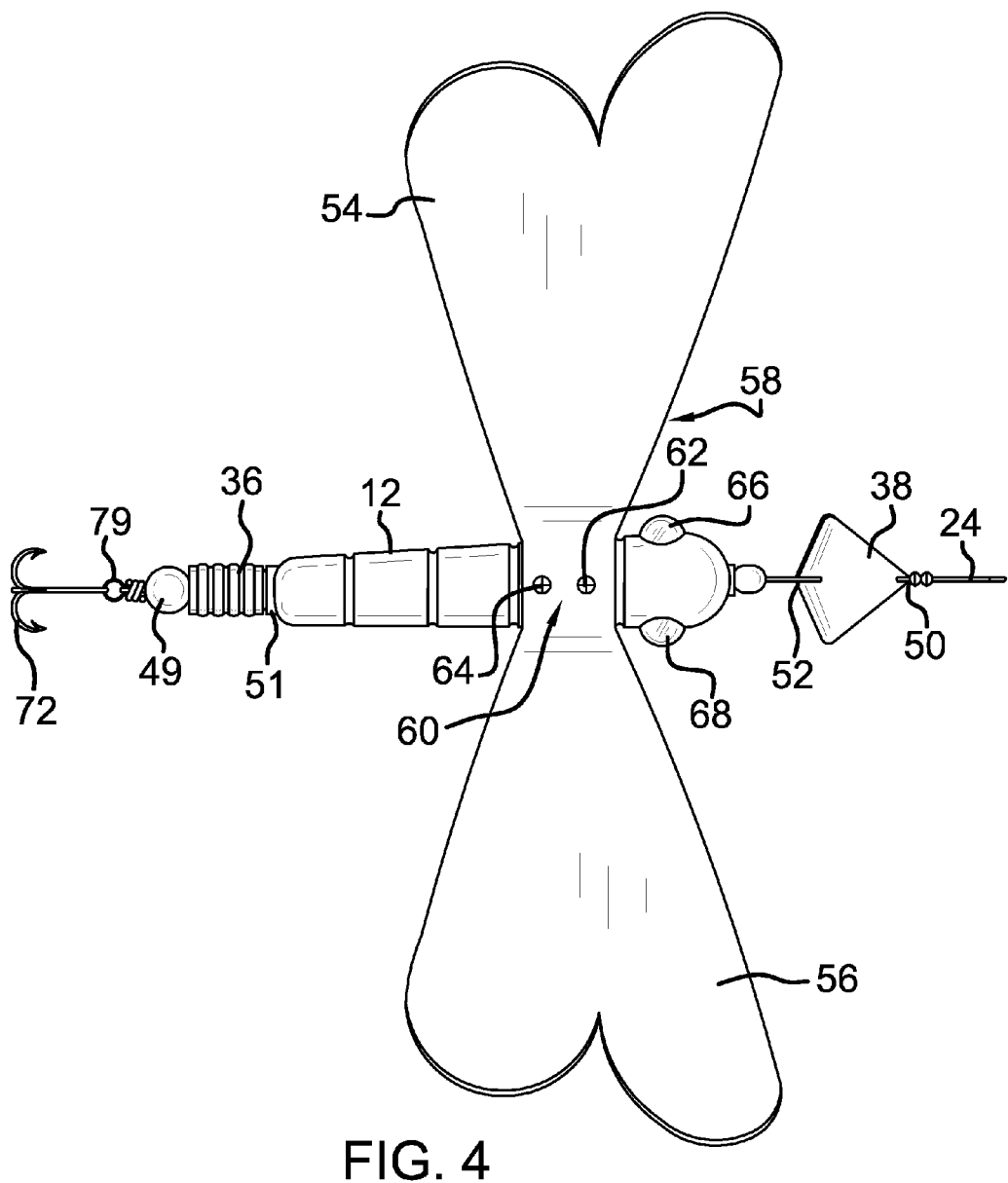
FIG. 4 is a top view of an embodiment of the disclosure.
Figure 5:
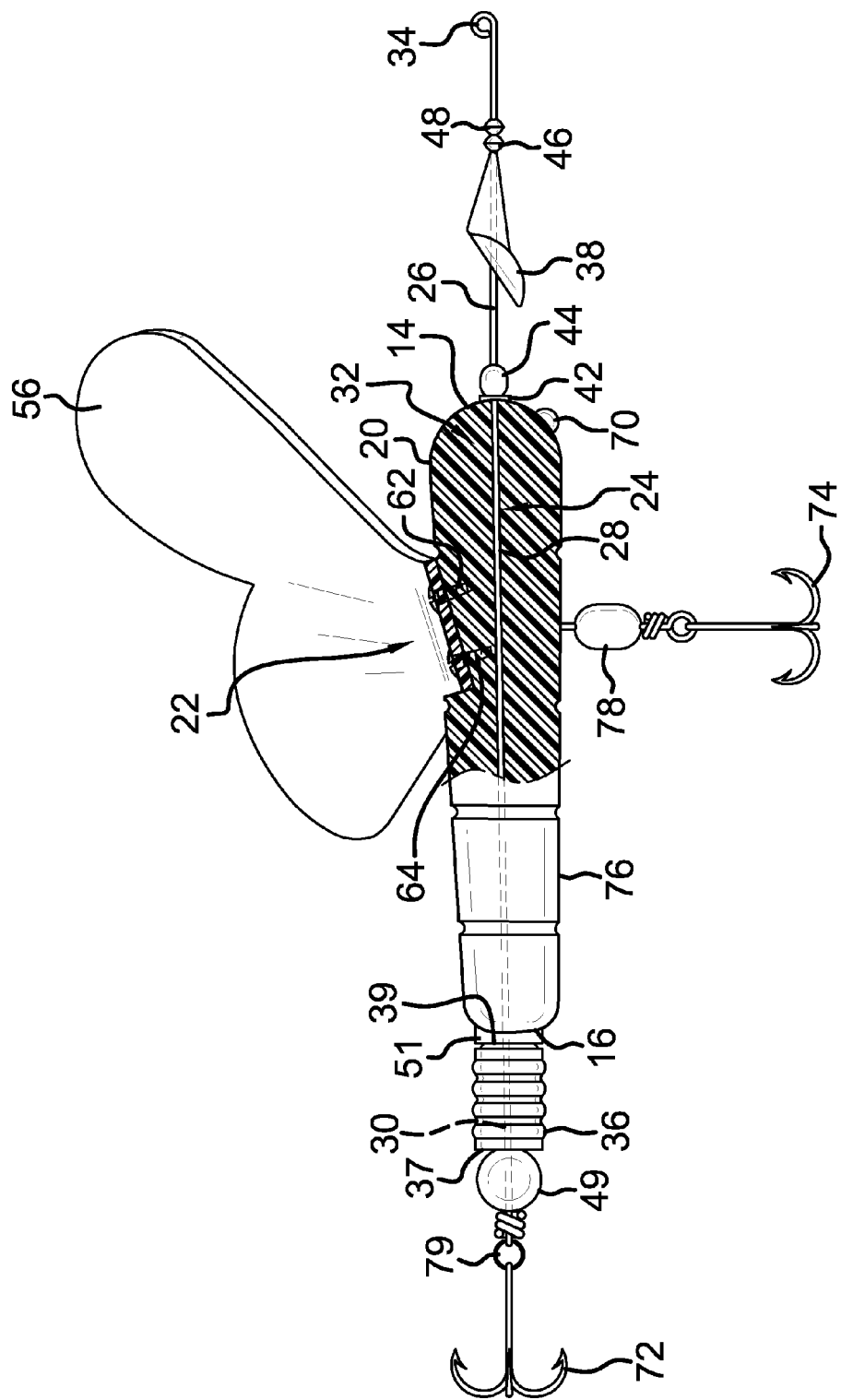
FIG. 5 is a partial cut-away side view of an embodiment of the disclosure.

With reference now to the drapanels, and in particular to FIGS. 1 through 5 thereof, a new fishing lure embodying the principles and concepts of an embodiment of the disclosure and generally designated by the reference numeral 10 will be described.

As best illustrated in FIGS. 1 through 5, the fishing lure device 10 generally comprises an elongated main body 12 having a front end 14, a rear end 16 and a perimeter surface 18 coupled to and extending between the front end 14 and the rear end 16. A longitudinal axis extends through the main body 12 between the front end 14 and the rear end 16. A top side 20 of the main body 12 has a notch 22 extending therein.

The main body 12 is constructed from a durable material, such as wood, plastic or the like. A length between the front end 14 and the rear end 16 may be between approximately 5.0 cm and 10.0 cm.

A shaft 24 is provided having a front section 26, a medial section 28 and a rear section 30. The front section 26 extends outwardly from the front end 14 of the main body 12. The rear section 30 extends outwardly from the rear end 16 of the main body 12. The medial section 28 is coupled to and extends between the front section 26 and the rear section 30 wherein the medial section 28 extends through an interior 32 of the main body 12. The front section 26 includes a loop 34 positioned distally relative to the front end 14 of the main body 12 for attaching the device 10 to a fishing line. The front section 26 may have a length extending from the front end 14 of the main body 12 to the loop 34 between approximately 10.0 cm and 18.0 cm. A weight 36 may be attached to the rear end 16 of the main body 12. The rear section 30 of the shaft 24 extends through the weight 36 so that the weight 36 is supported on the shaft 24. The weight 36 may weigh between approximately 4.25 grams and 10.0 grams.

A spinner blade 38 is attached to the front end 14 of the main body 12. The spinner blade 38 has an aperture 40 positioned therein. The front section 26 of the shaft 24 extends through the aperture 40. At least two spacers 42, 44, 46, 48 are positioned on the front section 26 of the shaft 24. The spacers 42, 44, 46, 48 are positioned on opposite ends 50, 52 of the spinner blade 38 to provide spacing between the spinner blade 38 and the main body 12 and the spinner blade 38 and the loop 34. This gives the spinner blade 38 sufficient space to spin in the water, which makes noise in an attempt to attract fish to the device 10. The spinner blade 38 may be constructed from aluminum or like material. The spacers 42, 44, 46, 48 may be constructed from metal, plastic or the like. Additional spacers 49, 51 may be provided and positioned on opposite ends 37, 39 of the weight 36.

The device 10 has a size and shape configured to resemble an insect, such as a dragonfly or the like. In an effort to achieve this, a pair of panels 54, 56 each having an insect wing shape, is coupled to the main body 12. Each of the panels 54, 56 is angled upwardly and outwardly away from the top side 20 of the main body 12. The panels 54, 56 are orientated in opposite directions with respect to each other and orientated perpendicular with respect to the longitudinal axis of the main body 12. The pair of panels 54, 56 may be formed from a single piece of material, such as plastic or the like, whereby the pair of panels 54, 56 define a panel assembly 58. A center 60 of the panel assembly 58 is insertable into the notch 22. A plurality of fasteners 62, 64 is insertable into the center 60 of the panel assembly 58 and engages the medial section 28 of the shaft 24 to retain the panel assembly 58 on the main body 12 and retain the shaft 24 in a static position relative to the main body 12. A pair of eye elements 66, 68 is attached to the main body 12 proximate the front end 14. Each of the eye elements 66, 68 may be made of acrylic glass or like material such that the eye elements 66, 68 are configured to relect sunlight into a body of water. The eye elements 66, 68 may each have a diameter between approximately 0.5 cm and 1.0 cm. A projection 70, such as a pin head or the like, is coupled to the front end 14 of the main body 12 and is configured to resemble a mouth of an insect.

A pair of hooks 72, 74 is attached to the main body 12. Each hook 72, 74 is configured to catch a fish thereon. One of the hooks 72 may be attached to the rear end 16 of the main body 12. One of the hooks 74 may be attached to a bottom side 76 of the main body 12 and positioned below the panels 54, 56. Each of the hooks 72, 74 is attached to the main body 12 using connectors 79, such as split rings as shown in the Figures. A swivel connection 78 may be coupled to the bottom side 76 of the main body 12 for swivelably coupling to the hook 74 attached to the bottom side 76 of the main body 12.

In use, as stated above and shown in the Figures, the loop 34 is attached to a fishing line. The fishing line is used to cast the lure towards the water and the hooks 72, 74 are used to catch fish in a generally conventional manner. The spinner 38 creates noise while rotating in the water, which helps attract fish to the device 10. The eye elements 66, 68 reflect sunlight into the water, which also helps attract fish to the device 10. The size of the device 10 casts a relatively large shadow, which also helps draw fish toward the device 10. The size and shape of the device 10 resembles an insect, such as a dragonfly, so that the device 10 functions as artificial bait for the fish. The panels 64, 66 are sized, shaped and positioned so that the device 10 glides toward the water and lands smoothly on the top surface of the water.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drapanels and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items follopanel the word are included, but items not specifically mentioned are not excluded. A reference to an element by the indefinite article "a" does not exclude the possibility that more than one of the element is present, unless the context clearly requires that there be only one of the elements.

We claim:

1. A fishing lure device comprising:
   an elongated main body having a front end, a rear end and a perimeter surface coupled to and extending between said front end and said rear end, a longitudinal axis extending through said main body between said front end and said rear end;
   at least one hook attached to said main body, each said hook being configured to catch a fish thereon;
   a pair of panels coupled to said main body, each of said panels being angled upwardly and outwardly away from a top side of said main body, said panels being orientated in opposite directions with respect to each other and orientated perpendicular with respect to said longitudinal axis of said main body;
   a shaft having a front section, a medial section and a rear section, said front section extending outwardly from said front end of said main body, said rear section extending outwardly from said rear end of said main body, said medial section being coupled to and extending between said front section and said rear section wherein said medial section extends through an interior of said main body, said front section including a loop positioned distally relative to said front end of said main body;
   said pair of panels being formed from a single piece of material whereby said pair of panels define a panel assembly;
   said top side of said main body having a notch extending therein, a center of said panel assembly being insertable into said notch; and
   a plurality of fasteners being insertable into said center of said panel assembly and engaging said medial section of said shaft to retain said panel assembly on said main body and retain said shaft in a static position relative to said main body.

2. The device of claim 1, further comprising a spinner blade attached to said front end of said main body, said spinner blade having an aperture positioned therein, said front section of said shaft extending through said aperture.

3. The device of claim 1, further comprising a pair of eye elements attached to said main body proximate said front end, each of said eye elements being configured to reflect sunlight into a body of water.

4. The device of claim 1, further comprising a weight being attached to said rear end of said main body, said rear section of said shaft extending through said weight.

5. The device of claim 1, further comprising a projection coupled to said front end of said main body, said projection being configured to resemble a mouth of an insect.

6. The device of claim 2, further comprising at least two spacers being positioned on said front section of said shaft, each said spacer being positioned on opposite ends of said spinner blade to provide spacing between said spinner blade and said main body and said spinner blade and said loop.

7. The device of claim 1, further comprising one of said hooks being attached to said rear end of said main body.

8. The device of claim 1, further comprising one of said hooks being attached to a bottom side of said main body and being positioned below said panels.

9. The device of claim 8, further comprising a swivel connection coupled to said bottom side of said main body and being swivelably coupled to said hook attached to said bottom side of said main body.

10. A fishing lure device comprising:
    an elongated main body having a front end, a rear end and a perimeter surface coupled to and extending between said front end and said rear end, a longitudinal axis extending through said main body between said front end and said rear end, a top side of said main body having a notch extending therein;
    a shaft having a front section, a medial section and a rear section, said front section extending outwardly from said front end of said main body, said rear section extending outwardly from said rear end of said main body, said medial section being coupled to and extending between said front section and said rear section wherein said medial section extends through an interior of said main body, said front section including a loop positioned distally relative to said front end of said main body;
    a spinner blade attached to said front end of said main body, said spinner blade having an aperture positioned therein, said front section of said shaft extending through said aperture;
    at least two spacers being positioned on said front section of said shaft, each said spacer being positioned on opposite ends of said spinner blade to provide spacing between said spinner blade and said main body and said spinner blade and said loop;
    a pair of panels coupled to said main body, each of said panels having an insect winged shape, each of said panels being angled upwardly and outwardly away from said top side of said main body, said panels being orientated in opposite directions with respect to each other and orientated perpendicular with respect to said longitudinal axis of said main body, said pair of panels being formed from a single piece of material whereby said pair of panels define a panel assembly, a center of said panel assembly being insertable into said notch;

a plurality of fasteners being insertable into said center of said panel assembly and engaging said medial section of said shaft to retain said panel assembly on said main body and retain said shaft in a static position relative to said main body;

a pair of eye elements attached to said main body proximate said front end, each of said eye elements being configured to reflect sunlight into a body of water;

a projection coupled to said front end of said main body, said projection being configured to resemble a mouth of an insect;

a weight being attached to said rear end of said main body, said rear section of said shaft extending through said weight;

at least one hook attached to said main body, each said hook being configured to catch a fish thereon, one of said hooks being attached to said rear end of said main body, one of said hooks being attached to a bottom side of said main body and being positioned below said panels; and a swivel connection coupled to said bottom side of said main body and being swivelably coupled to said hook attached to said bottom side of said main body.

\* \* \* \* \*